US008849044B2

(12) United States Patent
Ren et al.

(10) Patent No.: US 8,849,044 B2
(45) Date of Patent: Sep. 30, 2014

(54) METHOD AND APPARATUS FOR COMPARING VIDEOS (75) Inventors: Yansong Ren, Plano, TX (US); Fangzhe Chang, Edison, NJ (US); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 870 days.

(21) Appl. No.: 13/012,516

(22) Filed: Jan. 24, 2011

(65) Prior Publication Data

US 2012/0189212 A1   Jul. 26, 2012

(51) Int. Cl.
*G06K 9/68* (2006.01)
*G06F 17/30* (2006.01)
*G06T 7/00* (2006.01)
*G06K 9/00* (2006.01)

(52) U.S. Cl.
CPC ..... *G06T 7/0038* (2013.01); *G06T 2207/20021* (2013.01); *G06F 17/30802* (2013.01); *G06T 2207/10016* (2013.01); *G06K 9/00758* (2013.01)
USPC ........................................................ 382/218

(58) Field of Classification Search
CPC . G06K 9/00758; G06K 9/00765; G06K 9/68; G06T 7/0026; G06T 7/0034; G06T 7/0016; G06T 7/2013; G06T 7/0038; G06T 2207/10016; G06T 2207/20021; G06F 17/30802
See application file for complete search history.

(56) References Cited

U.S. PATENT DOCUMENTS 7,472,242 B1 * 12/2008 Deshmukh et al. ........... 711/162

FOREIGN PATENT DOCUMENTS

EP         2 214 106 A2    8/2010
WO   WO 2010/078629 A1    7/2010

OTHER PUBLICATIONS

Xiao Wu et al., "Practical Elimination of Near-Duplicates from Web Video Search," Proceedings of the 15th International Conference on Multimedia, XP055030247, pp. 218-227, Jan. 1, 2007.
Bashar Tahayna et al., "An Efficient Method for Near-Duplicate Video Detection," Advances in Multimedia Information Processing, XP019112852, pp. 377-386, Dec. 9, 2008.
International Search Report for PCT/IB2012/000269 dated Jul. 4, 2012.

* cited by examiner

*Primary Examiner* — Chan Park
*Assistant Examiner* — Elisa Rice
(74) *Attorney, Agent, or Firm* — Fay Sharpe LLP (57) ABSTRACT A method for comparing a query video and a target video includes partitioning frames of the query video and frames of the target video into blocks and calculating the mean intensity value for each block. A plurality of query time series is produced for the query video, each query time series representing temporal variation in mean intensity value for blocks from the same location in different frames of the query video. A plurality of target time series is produced for the target video, each target time series representing temporal variation in mean intensity value for blocks from the same location in different frames of the target video the query time series and the target time series are used in determining if alignment exists between the query video and the target video.

27 Claims, 9 Drawing Sheets

|      | T1 | T2 | T3 | T4 | T5 | T6 | T7 | T8 | T9 | T10 | T11 | T12 | T13 | T14 | T15 | T16 | T17 |
|------|----|----|----|----|----|----|----|----|----|-----|-----|-----|-----|-----|-----|-----|-----|
| Q1   |    |    |    |    |    |    |    |    |    |     |     |     |     |     |     |     |     |
| Q2   |    | 1  |    |    |    |    |    |    |    |     |     |     |     |     |     |     |     |
| Q3   | 1  |    | 1  |    |    |    |    |    |    |     |     |     |     |     |     |     |     |
| Q4   |    |    |    | 1  |    |    |    |    |    |     |     |     |     |     |     |     |     |
| Q5   |    |    | 1  | 1  | 1  |    |    |    |    |     |     |     |     |     | 1   |     |     |
| Q6   |    |    |    |    |    |    |    | 1  |    |     |     |     |     |     | 1   |     | 1   |
| Q7   |    | 1  | 1  |    |    | 1  |    |    |    |     |     |     |     |     |     |     |     |
| Q8   |    |    |    |    | 1  |    |    | 1  |    |     |     |     |     | 1   | 1   |     |     |
| Q9   |    |    | 1  |    |    |    |    | 1  | 1  |     |     |     | 1   |     |     |     |     |
| Q10  |    |    |    |    |    | 1  |    |    |    | 1   |     |     |     |     |     |     |     |
| Q11  |    | 1  |    |    |    |    |    |    |    |     | 1   |     |     | 1   |     |     |     |
| Q12  |    |    |    |    |    | 1  |    |    |    | 1   |     | 1   |     | 1   |     |     |     |
| Q13  |    |    | 1  | 1  |    |    |    |    |    |     |     |     | 1   |     |     |     |     |
| Q14  | 1  |    |    |    |    |    |    |    | 1  |     |     | 1   |     |     |     |     |     |
| Q15  |    |    | 1  |    |    |    |    |    |    |     |     |     |     |     | 1   |     |     |
| Q16  |    |    |    | 1  |    |    |    |    |    |     |     |     |     |     |     | 1   |     |

*FIG. 6*

Two sequences of major inclines/declines with pairwise matching results, where "1" indicates match.

Figure 4. (a) identify diagonals that indicate single matches or consecutive matches, (b) ignore short diagonals, (c) select the top K diagonal lines, (d) select diagonals with high score, join diagonals, and determine the potential approximate alignments

FIG. 9

METHOD AND APPARATUS FOR COMPARING VIDEOS

FIELD OF THE INVENTION

The present invention relates to a method and apparatus for comparing videos.

BACKGROUND

In a video hosting website, such as, for example, YouTube, Google Video and Yahoo! Video, video content may be uploaded by users to the site and made available to others via search engines. It is believed that current web video search engines provide a list of search results ranked according to their relevance scores based on a particular a text query entered by a user. The user must then consider the results to find the video or videos of interest.

Since it is easy for users to upload videos to a host, obtain videos and distribute them again with some modifications, there are potentially numerous duplicate, or near duplicate, contents in the video searching results. Such duplicates would be considered by a user to be "essentially the same", based on their overall content and subjective impression. For example, duplicate video content may include video sequences with identical or approximately identical content but which are in different file formats, have different encoding parameters, and/or are of different lengths. Other differences may be photometric variations, such as color and/or lighting changes, and/or minor editing operations in spatial or and temporal domain, such as the addition or alteration of captions, logos and/or borders. These examples are not intended to be an exhaustive list and other types of difference may also occur in duplicate videos.

The proliferation of duplicate videos can make it difficult or inconvenient for a user to find the content he or she actually wants. As an example, based on sample queries from YouTube, Google Video and Yahoo! Video, on average it was found that there are more than 27% near-duplicate videos listed in search results, with popular videos being those that are most duplicated in the results. Given a high percentage of duplicate videos in search results, users must spend significant time to sift through them to find the videos they need and must repeatedly watch similar copies of videos which have already been viewed. The duplicate results depreciate users' experience of video search, retrieval and browsing. In addition, such duplicated video content increases network overhead by storing and transferring duplicated video data across networks.

One type of video copy detection technique is sequence matching. In sequence matching, an interval of time with multiple frames provides a basis for comparing the similarity of a query video and a target video. Typically, this involves extracting a sequence of features, which may be, for example, ordinal, motion, color and centroid-based features, from both the query video frames and the target video frames. The extracted feature sequences are then compared to determine the similarity distance between the videos. For example, where ordinal signatures are used, each video frame is first partitioned into N1×N2 blocks and the average intensity of each block is calculated. Then, for each frame, the blocks are ranked according to their average intensities. The ranking order is considered to be that frame's ordinal measure. The sequence of ordinal measures for one video is compared with that of the other to assess their similarity.

Sequence matching enables the start of the overlapping position between duplicate videos to be determined. Sequence matching approaches are suitable for identifying almost identical videos and copies of videos with format modifications, such as coding and frame resolution changes, and those with minor editing in the spatial and temporal domains. In particular, using spatial and temporal ordinal signatures allows detection of video distortions introduced by video digitalization/encoding processes (for example, changes in color, brightness and histogram equalization, encoding parameters) and display format conversions (for example converting to letter-box or pillar-box) and modification of partial content (for example, cropping and zooming in).

Sequence matching techniques involve a relatively easy calculation and provide a compact representation of a frame, particularly when using ordinal measures. Sequence matching tends to be computationally efficient and real time computations may be carried out for processing live video. For example, an ordinal measure with 2×2 partitions of a frame needs only 4-dimensions to represent each frame, requiring fewer comparison points between two frames.

However, existing sequence matching based techniques are unable to detect duplicate video clips where there are changes in frame sequences, such as insertion, deletion or substitutions of frames. Changes of frame sequences are introduced by user editing, or by video hosting websites to insert commercials into a video, for example. Since it is not feasible to assume the type of user modification beforehand, the lack of ability to detect frame sequence changes limits the applicability of sequence matching techniques to real life problems.

Existing solutions for detecting duplicate videos with frame sequence alterations such as insertions, deletions or substitutions of frames, are based on keyframe matching techniques.

Keyframe matching techniques usually segment videos into a series of keyframes to represent the videos. Each keyframe is then partitioned into regions and features are extracted from salient local regions. The features may be, for example, color, texture, corners, or shape features for each region. Keyframe matching is capable of detecting approximate copies that have undergone a substantial degree of editing, such as changes in temporal order or insertion/deletion of frames. However, since there are simply too many local features in a keyframe, it is computationally expensive to identify keyframes, extract local features from each keyframe and conduct metric distance comparison between them to match a video clip against a large number of videos in database.

Recent research has been aimed at improving the speed of keyframe matching methods by fast indexing the feature vectors or by using statistical information to reduce the dimension of feature vectors. However, for online analysis, both the cost of segmenting videos into keyframes and the cost of extracting local features from a query video are still unavoidable. It becomes a real challenge to provide online real-time video duplication detection in a Web 2.0 video hosting environment. Keyframe matching approaches are more suitable for offline video redundancy detection with fine-grain analysis to aggregate and classify database videos.

BRIEF SUMMARY

According to a first aspect of the invention, a method for comparing a query video and a target video includes partitioning frames of the query video and frames of the target video into blocks and calculating the mean intensity value for each block. A plurality of query time series is produced for the query video, each query time series representing temporal variation in mean intensity value for blocks from the same location in different frames of the query video. A plurality of target time series is produced for the target video, each target time series representing temporal variation in mean intensity value for blocks from the same location in different frames of the target video. The query time series and the target time series are used in determining if alignment exists between the query video and the target video. By using the invention, time series may be produced which can be compared for similarities. Duplicate videos show similarities in the their respective time series, which may be used to identify that they are related. A method in accordance with the invention offers efficient video duplication detection by reducing the comparison space between two videos.

An embodiment includes segmenting the query time series and the target time series into a respective set of discrete linear segments and performing local sequence alignment of those linear segments. Linear segmentation enables mean video intensities to be compressed into a discrete list of linear inclines/declines which may then be compared for alignment.

In duplicate videos, the overlapping video regions usually do not span the entire length of video sequences and similar regions could be isolated. Therefore, local alignment of linear segments is needed. In bioinformatics, the Smith-Waterman algorithm is well-known for determining similar regions between two nucleotide or protein sequences. The Smith-Waterman algorithm compares string segments of all possible lengths and optimizes the similarity measure. The present inventors have realized that the Smith-Waterman algorithm may be extended to perform local alignment for video intensity segments. Instead of comparing strings, intensity linear segments are compared to find local optimal alignment between videos.

The Smith-Waterman algorithm is a dynamic programming algorithm to provide optimized search. It is fairly demanding of time and memory resources: the computational complexity is O(MN) and the storage is O(min(M, N)), where M and N are the lengths of the sequences under comparison.

To accelerate the search process, instead of aligning all intensity segments, in an embodiment, a sequence of major inclines/declines is selected as representations of key signatures of compared videos. A heuristic method is applied to provide fast alignment of those major inclines/major declines by excising alignments that unlikely to result in a successful alignment before performing the more time-consuming Smith-Waterman algorithm. This reduces computational cost. The heuristic method expedites the execution of the matching algorithm by filtering out very dissimilar videos and by narrowing down the potential matched regions for similar videos.

An embodiment in accordance with the invention may be advantageous where it is not feasible to know the types of user modifications in advance before applying video duplication detection techniques, allowing sequence matching techniques to be used. In addition, it retains the advantages of using sequence matching approaches, which is to provide efficient detection.

Detecting duplicate video with frame changes using an embodiment in accordance with the invention may be used by video hosting websites as a user feature; or used by video content providers to keep track of royalty payments and to detect possible copyright infringements; or used by communication "pipes" (e.g. Internet Service Providers (ISPs), peer-to-peer (P2P) system providers, content distribution network (CDN)) to reduce network traffic and to manage the storage of video content. It could assist video hosting websites in removing or aggregating near-duplicate videos to provide service for users to search, retrieval and browsing. It could also facilitate video content-based searching by finding similar videos, for example, with high quality (HD) or 3D.

A pre-existing video duplication system may be modified to include an embodiment in accordance with the invention, to enhance the ability to handle user modifications, such as frame insertions, deletions, or substitutions.

According to a second aspect of the invention, a device is programmed or configured to perform a method in accordance with the first aspect.

According to a third aspect of the invention, a data storage medium is provided for storing a machine-executable program for performing a method in accordance with the first aspect.

BRIEF DESCRIPTION OF THE DRAWINGS

Some embodiments of the present invention will now be described by way of example only, and with reference to the accompanying drawings, in which.

DETAILED DESCRIPTION

Figure 1:
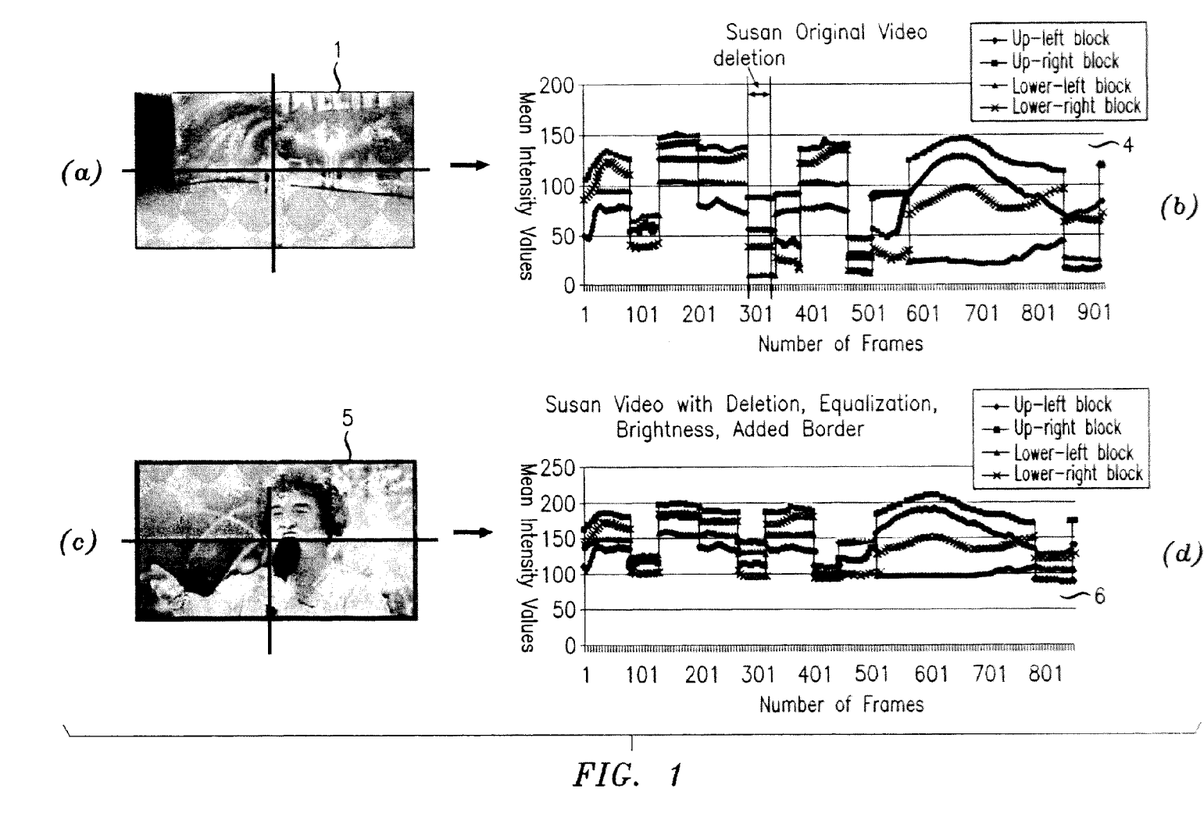
FIG. 1 schematically illustrates videos to be compared and a stage in a comparison process.

With reference to FIG. 1, a query video 1 comprising a plurality of frames is to be compared one or more target videos to determine if they are duplicates.

Figure 2:
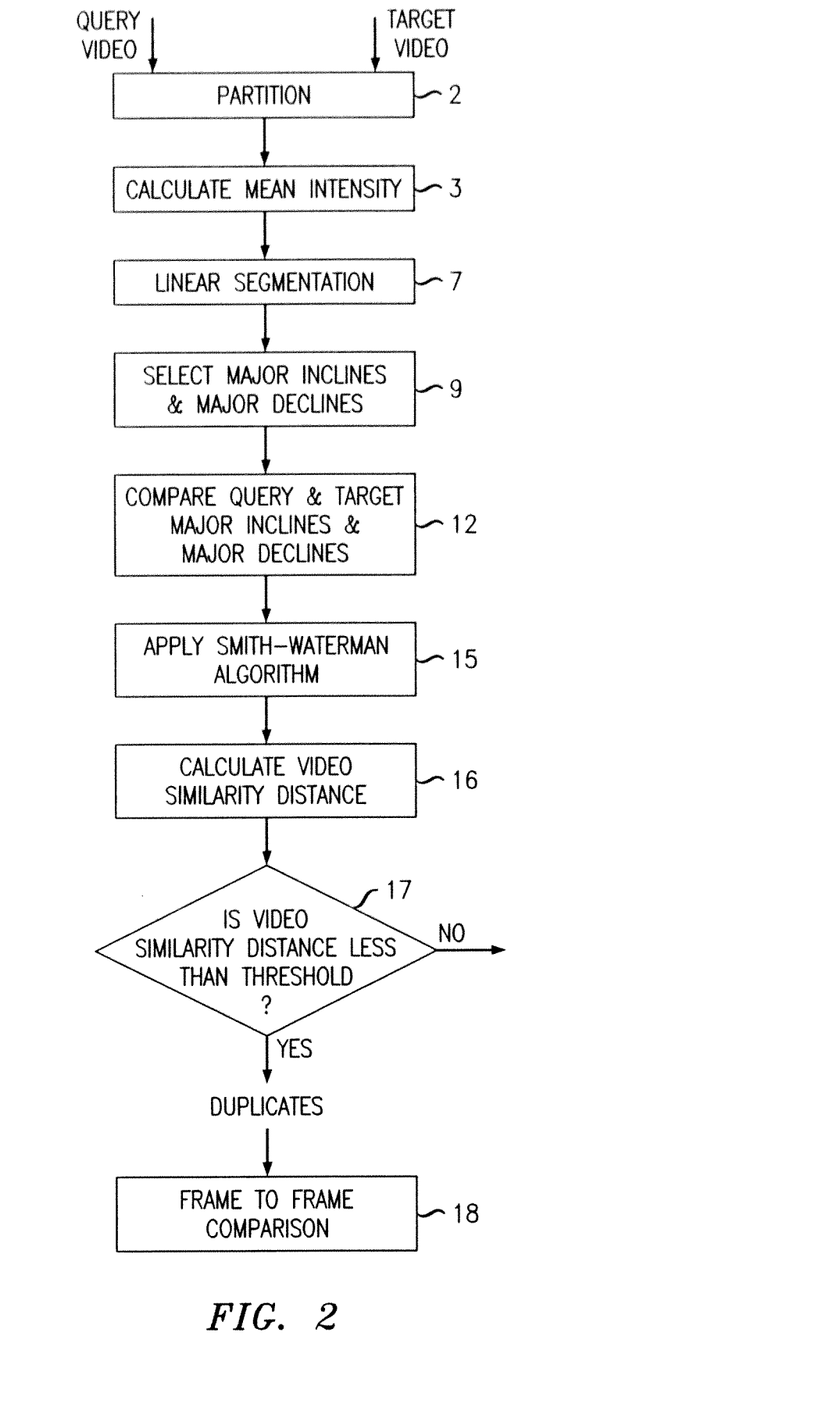
FIG. 2 schematically illustrates a method in accordance with the invention.

With reference to FIG. 2, at 2, each frame in the query video 1 is partitioned into N1×N2 blocks. The mean intensity value for each block is calculated at 3. By partitioning each frame, variations in intensity changes in the partitioned sub-regions are retained. For each block, the calculated mean intensity value is plotted against frame number to produce a query time series at 4. In this embodiment, all blocks are processed provide N1×N2 time series associated with the video 1. In another embodiment, selected blocks only are involved, thus resulting in fewer than N1×N2 time series being produced.

For comparison, a target video 5 shown in FIG. 1 is based on the query video 1 but has been modified with histogram equalization, added brightness and border and frame deletion. When the target video 5 is processed in the same manner as described above, target time series shown at 6 are obtained. It can be seen that the changes in intensity for blocks from the target video 5 are generally similar in form to those of the video 1. For example, at frame number 806 for the query time series at 4, the mean intensity for one block increases while that of another decreases so that they cross over. A similar cross over can be seen at frame 739 for the target time series at 6.

The next step at 7 in FIG. 2 is to capture information provided by temporal changes in the query and target time series by using piecewise linear segmentation techniques. By segmenting the time series, the video is compressed and most of the essential information in the temporal changes of video intensities is captured. Due to user modification, video distortion and format conversions, one would not expect find exact matches in video duplicate detection and ignoring minor changes of temporal intensities makes the video duplicate detection process relatively insensitive to noise.

Figure 3A:
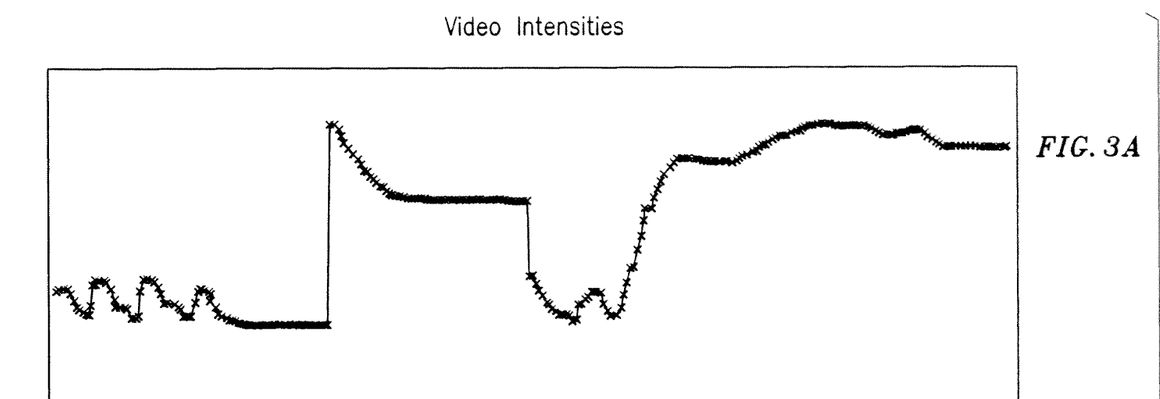
FIG. 3 schematically illustrates changes in intensity with time for one block.
Figure 3B:
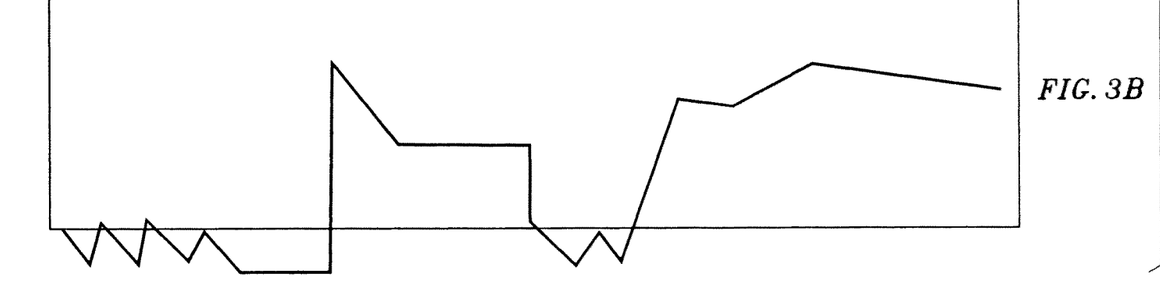

FIG. 3a illustrates variation in mean intensity for part of one time series such as that shown at 4 or 6 in FIG. 1. FIG. 3b illustrates the part of the time series shown in FIG. 1a after linear segmentation has been applied.

A Bottom-Up algorithm is used to segment the time series. The Bottom-Up approach is a well-known approximation algorithm in time series. It starts from the finest possible approximation and iteratively merges segments until a stopping criterion is met. In this case, linear interpolation is used rather than linear regression to find the approximating line since linear interpolation can be obtained in constant time with low computational complexity. The quality of fit for a potential segment is evaluated using residual error. A residual error is calculated by taking all the vertical differences between the best-fit line and the actual data points, squaring them and then summing them together.

Figure 4A:
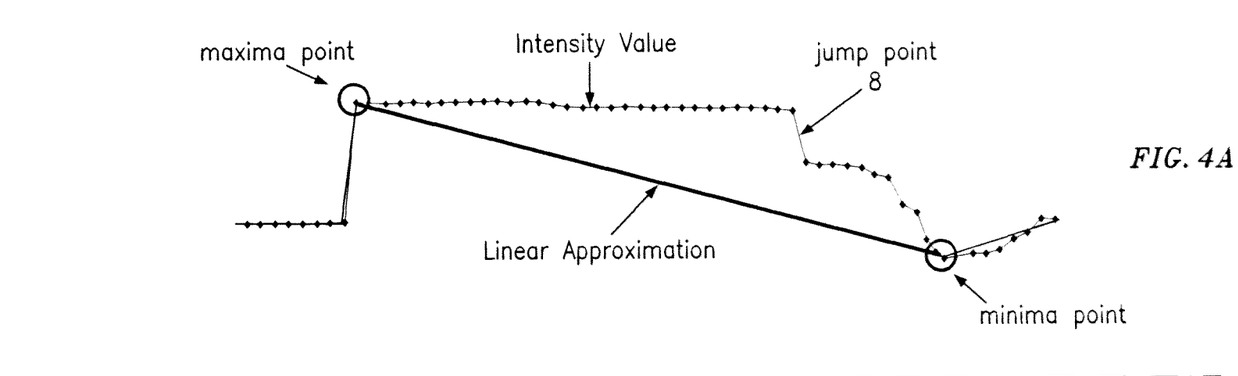
FIG. 4 schematically illustrates linear segmentation.
Figure 4B:
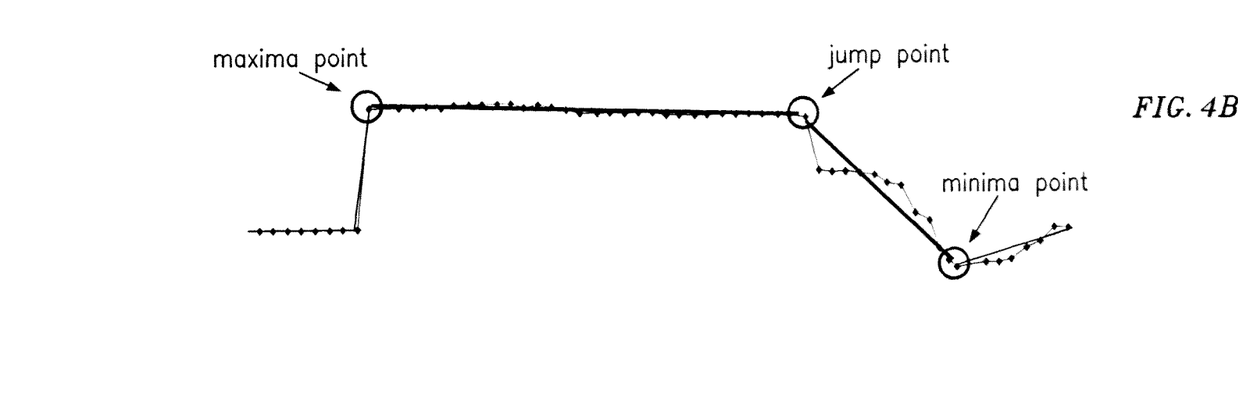

In another embodiment, the fast linear segmentation of the time series is achieved by an interpolation method using extraction of major maxima and major minima points as extrema points. FIG. 4a shows a linear approximation using maxima and minima points. However, the inventors have realized that relying only on these points excludes jump points, such as that shown at 8. Jump points correspond to rapid changes in values, such as, for example, a jump up or down, within a short time distance. For intensity curves of video block series, these jumps typically indicate shot boundaries, caused by hard cuts or fades in/out. Thus, in this embodiment, the linear segmentation technique is extended to also include jump points so that the extrema points used in the linear segmentation method are maxima points, minima points and jump points, as illustrated in FIG. 4b.

Following linear segmentation of the time series, major inclines/declines in the time series are selected at 9 as providing significant video signatures. This enables the search space for aligning linear segments to be reduced.

The linear segments with longer distance and deeper height usually represent conspicuous changes in a scene. They are therefore chosen as major inclines. Matching consecutive major inclines indicates video copies following similar behavior with the same sequence of major scene changes. In contrast, linear segments of deep heights but of very short lengths are typically associated with shot boundaries, such as hard cuts or fades. Such linear segments often contain less information than those representing changes within a scene. A shot boundary can be determined if the linear segments from all partitioned blocks have deep heights within a same short distance occurring at a same time (i.e. the same starting frame IDs). Those linear segments representing shot boundaries are ignored in the process of selecting major inclines.

Figure 5:
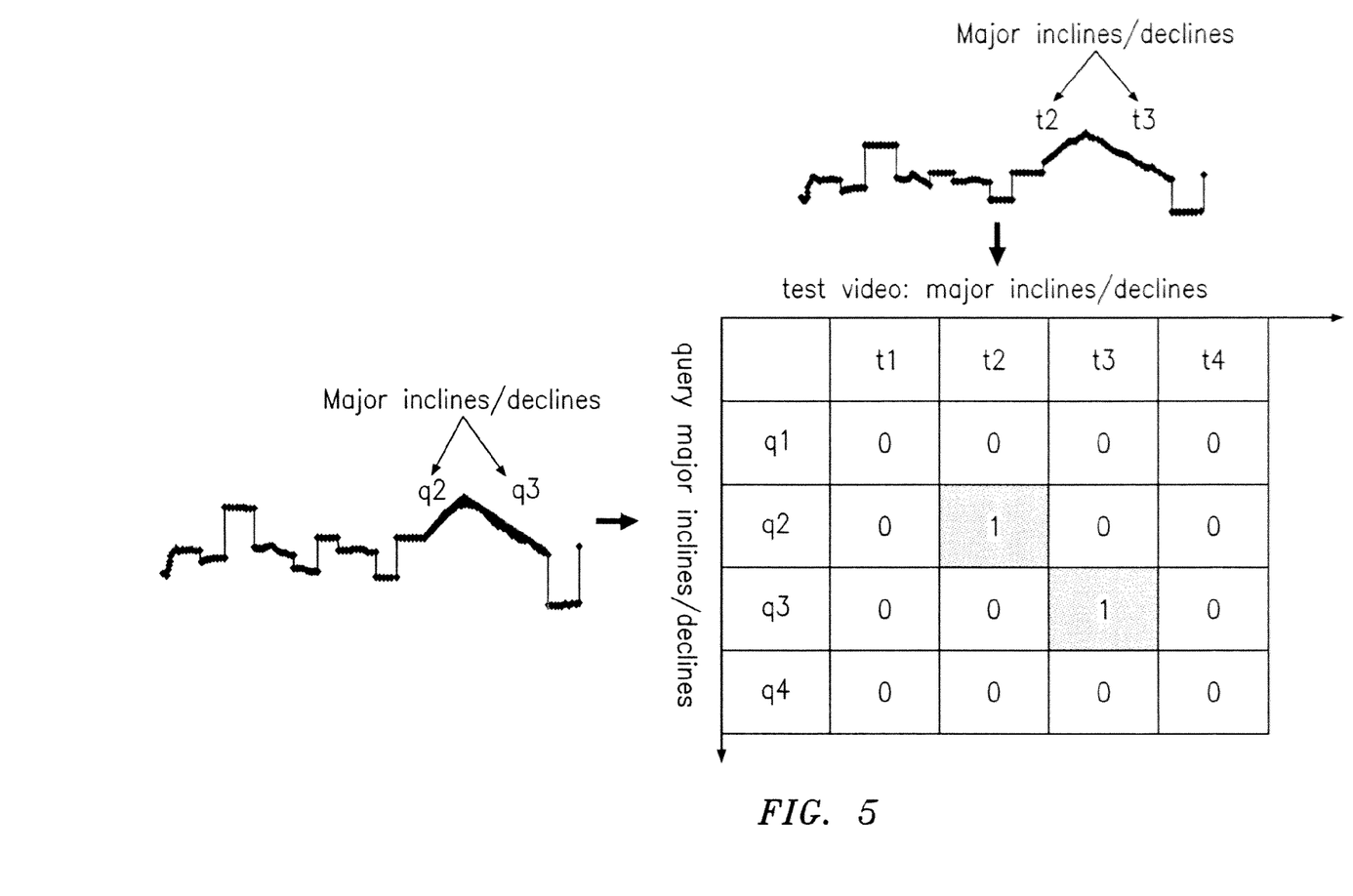
FIG. 5 schematically illustrates changes in intensity for compared videos.
Figure 6:
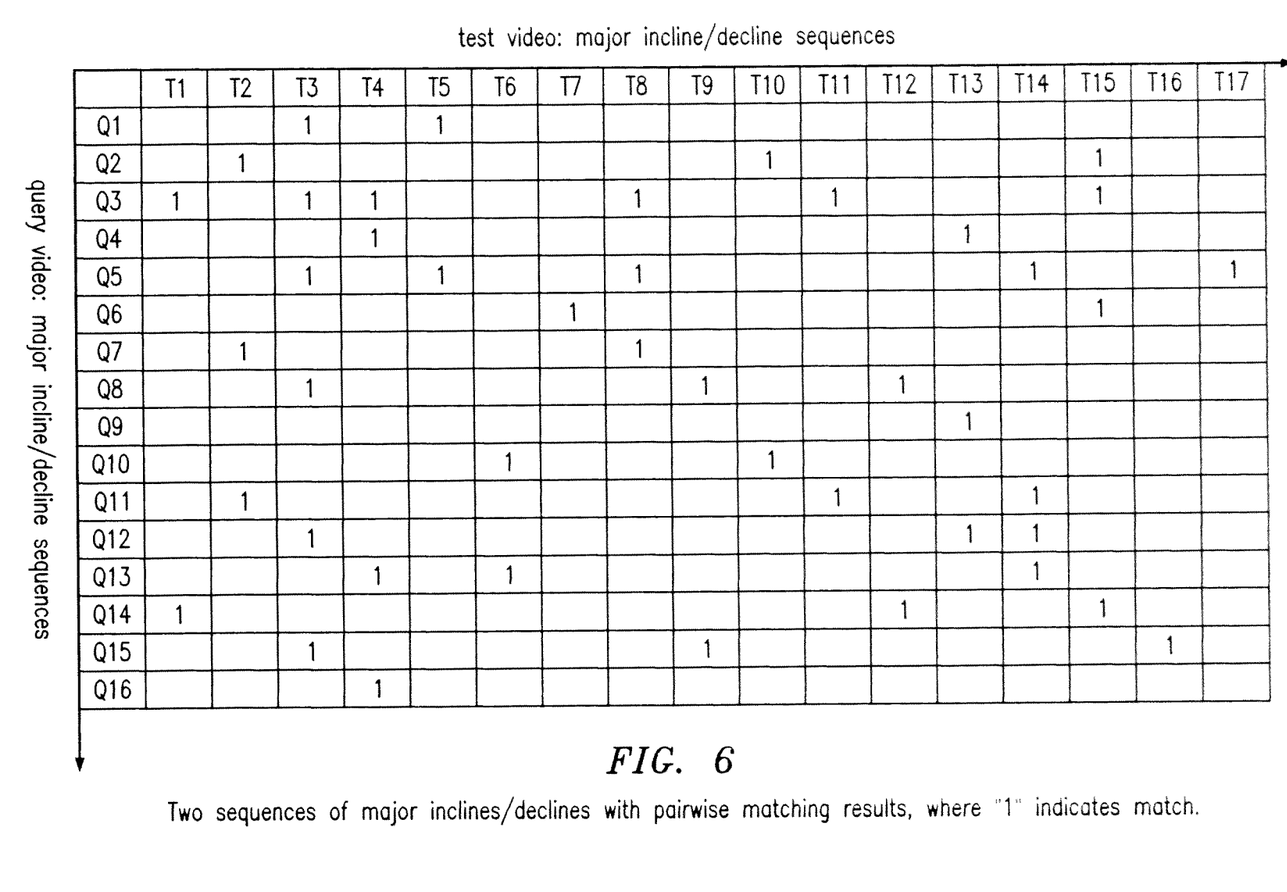
FIG. 6 schematically illustrates a matrix used in the method of FIG. 2.

At 12, the major inclines/declines of a query video and a target video are compared, as illustrated in FIG. 5, to find approximate alignments with consecutive matched inclines/declines that are likely to lead to a successful alignment. With reference to FIG. 6, an M1 by M2 matrix is generated, where M1 and M2 are the lengths of the major inclines/declines sequences under comparison. If two major inclines/declines at i and j match, value "1" is put in matrix (i, j). To check the similarity between a linear segment $S_1[i_1, \ldots, j_1]$, and a segment $S_2[i_2, \ldots, j_2]$, we consider not only the heights and lengths of the segments, but also the similarity of video frames contained in the two segments. More precisely, these two segments are similar if $$ratio_L \leq \frac{j_1 - i_1}{j_2 - i_2} \leq 1/ratio_L.$$

That is, two segments are of similar lengths. In this implementation, $ratio_L = 0.9$.

$$ratio_H \leq \frac{S[j_1] - S[i_1]}{S[j_2] - S[i_2]} \leq 1/ratio_H.$$

That is, two segments are of similar lengths. In this implementation, $ratio_H = 0.75$.

$\min_p D(p) \leq dist$. In other words, the minimal distance between the two corresponding frame sequences is at most the threshold constant dist when 'sliding' the shorter sequence along the longer sequence, where p ranges over the beginning of the sliding frame position in the longer video. In this embodiment, we choose the spatial and temporal ordinal signature algorithms for calculating the video similarity distance due to its efficiency and accuracy.

Given two frame sequences $F_1$ and $F_2$, the ordinal signature measurement calculates the distance between two frame sequences $F_1$ and $F_2$ $$D(p) = \frac{1}{L}\sum_{i=1}^{L} |ordinal^{F_1}(i) - ordinal^{F_2}(p+i)|$$

where $L = j_1 - i_1$ is the length of the shorter sequence.

Since user modification and video processing techniques could cause differences in video intensity values, such as histogram equalization, frame resizing or cropping, changes in brightness/color/hue, other added noises, the heights of similar intensity linear segments could be different. The distances of similar linear segments could also be different due to linear segment approximation error or other user introduced noises. The use of parameter $ratio_H$ and $ratio_L$ allows tolerance of such noises to a certain degree. Even though here the ordinal signatures based measurement D(p) is used to calculate distance of two frame sequences, matching of video frames can be based on other global descriptors or even local descriptors, using sequence matching or keyframe based matching algorithms.

Figure 7:
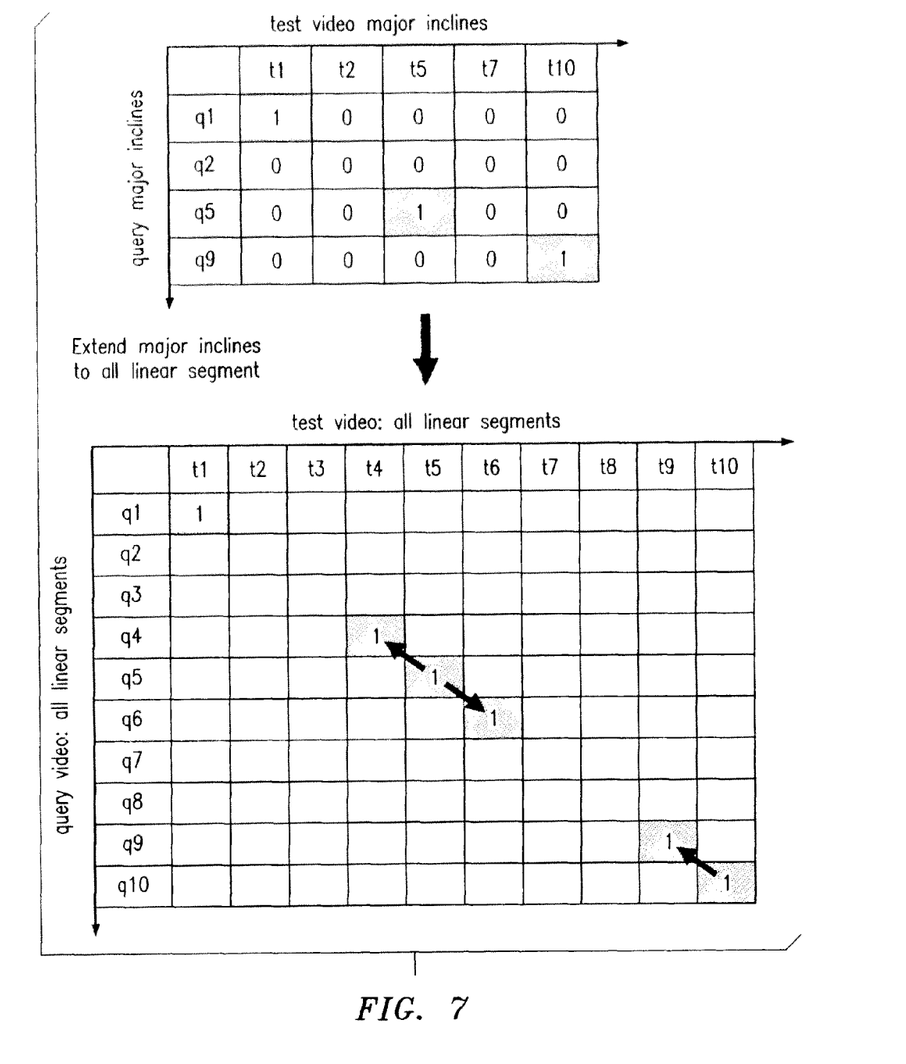
FIG. 7 schematically illustrates steps in matching used in the method of FIG. 2.

Alter aligning major inclines, the potential major inclines alignments are extended to neighbor non-major inclines to find more aligned linear segments, as shown in FIG. 7. This step filters out unnecessary alignments to reduce the number of comparisons needed for applying the Smith-Waterman algorithm in the next stage.

Figure 8:
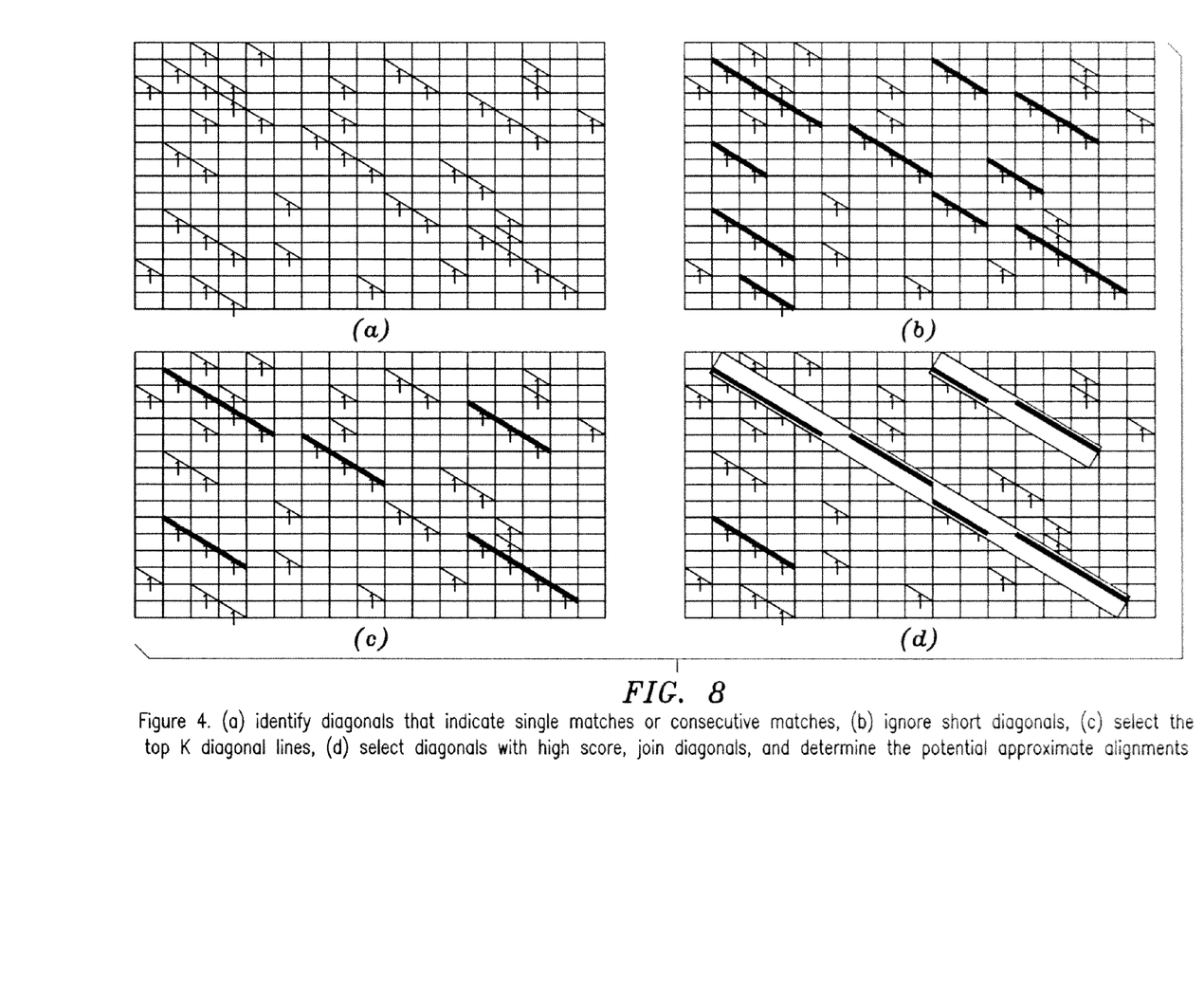
FIG. 8 schematically illustrates steps in matching used in the method of FIG. 2.

At the next step, to find the key approximate alignments, the inventors have realized that alignment can be carried out using an approach similar to that provided by FASTA, which is a fast search algorithm used in finding similar DNA and protein sequences. All diagonal lines of consecutive value "1"s in the matrix are identified, as shown in FIG. 8(a). Next, those diagonal lines whose length is longer than a predefined threshold are retained and single matches and short aligned segments are ignored, as illustrated in FIG. 8(b). Then, the top K longest diagonal lines are selected, as shown in FIG. 8(c). To extend the overall length of an alignment, an attempt is made to join those segments of the top K diagonal lines that are close to each other to form a longer segment. Gaps are allowed in the joined longer segments to take account of frame insertions, deletions and substitutions.

Reward scores are assigned to diagonal matched lines and penalty scores to gaps, that is, mismatches, when connecting neighboring diagonal lines. A score is obtained by adding the reward scores of each of the connected diagonals and subtracting the gap penalties. If the score of a linked approximate alignment exceeds a given threshold, a check is made to determine if the previously ignored initial short aligned segments around the linked segments can be joined to form an approximate alignment with gaps, as shown in FIG. 8(d). Finally, the local approximate alignments having final scores exceeding a threshold are selected for further examination.

The next stage at 15 is to conduct fine-grain alignment of all intensity linear segments of compared videos by applying the Smith-Waterman algorithm. Based on the approximate alignments of major inclines/declines found previously, lists of linear intensity segments that could lead to successful alignment can be determined. The Smith-Waterman algorithm only needs to examine a restricted range of linear segments.

The Smith-Waterman algorithm uses edit distance to find the optimal alignment. It constructs a scoring matrix H as follows:

$$H(i, 0) = 0, 0 \leq i \leq M$$

$$H(0, j) = 0, 0 \leq j \leq N$$

$$H(i, j) = \max \begin{Bmatrix} 0 \\ H(i-1, j-1) + \omega(x_i, y_j) \text{ Match/Mismatch} \\ H(i-1, j) + \omega(x_i, -) \text{ Deletion} \\ H(i, j-1) + \omega(-, y_j) \text{ Insertion} \end{Bmatrix},$$

$$0 \leq i \leq M, 0 \leq j \leq N$$

where x and y are the lists of linear segments that are potentially aligned, M and N are the lengths of x and y sequences, and $\omega(x_i, y_j)$ is a scoring scheme. If $x_i$ and $y_j$ match, $\omega(x_i, y_j)$ is positive and if they don't match, it is negative. For insertion and deletion, $\omega(x_i, -)$ and $\omega(-, y_j)$ are negative.

The Smith-Waterman algorithm finds the local alignment by searching for the maximal score in matrix H and then tracking back the optimal path depending on the direction of movement used to construct the matrix. It maintains this process until a score of 0 is reached. Once the local optimal alignment is obtained, the video similarity distance is calculated at 16 by applying existing sequence matching techniques for the matched linear segments. In this embodiment, ordinal measurement with 2×2 partitions is used to determine the video similarity distance. If the distance is found to be less than a threshold at 17, the two compared videos are considered to be duplicates.

Next, alignment at video frame level is examined at 18, instead of at linear segment level, for linear segments. Since the optimal local alignment is based on intensity linear segments, if frame changes occur inside a segment, the entire segment is considered as not being a match using the Smith-Waterman algorithm, as discussed above. To find potential matching positions inside the unmatched segments, a frame to frame comparison is conducted to calculate the frame level similarity distance. If a frame similarity distance is less than the video similarity distance obtained using the Smith-Waterman algorithm, those frames are considered to be matched. This ensures that the similarity distance of the matched frames inside those unmatched segments will not exceed the average video similarity distance obtained from the rest of the matched segments. Frame comparisons are initiated from both the beginning and the end of the unmatched segments, towards the middle of the segments. Matching is continued until a frame similarity distance is larger than the video similarity distance. The video overlapping positions are then updated.

Thus, in this embodiment, the changes of intensity values of partitioned blocks are first considered as time series. Then, the time series are segmented into a list of discrete linear representations. Local sequence alignment is performed of those linear segments to find optimal matching position. Then video similarity distance is calculated based on the potential alignment position. If the best matching similarity distance is less than a given threshold, two videos are considered as duplicate. To handle changes of frames, gaps, the result of frame insertions, deletions, and substitutions, are permitted to exist when in comparing linear sequence segments.

Figure 9:
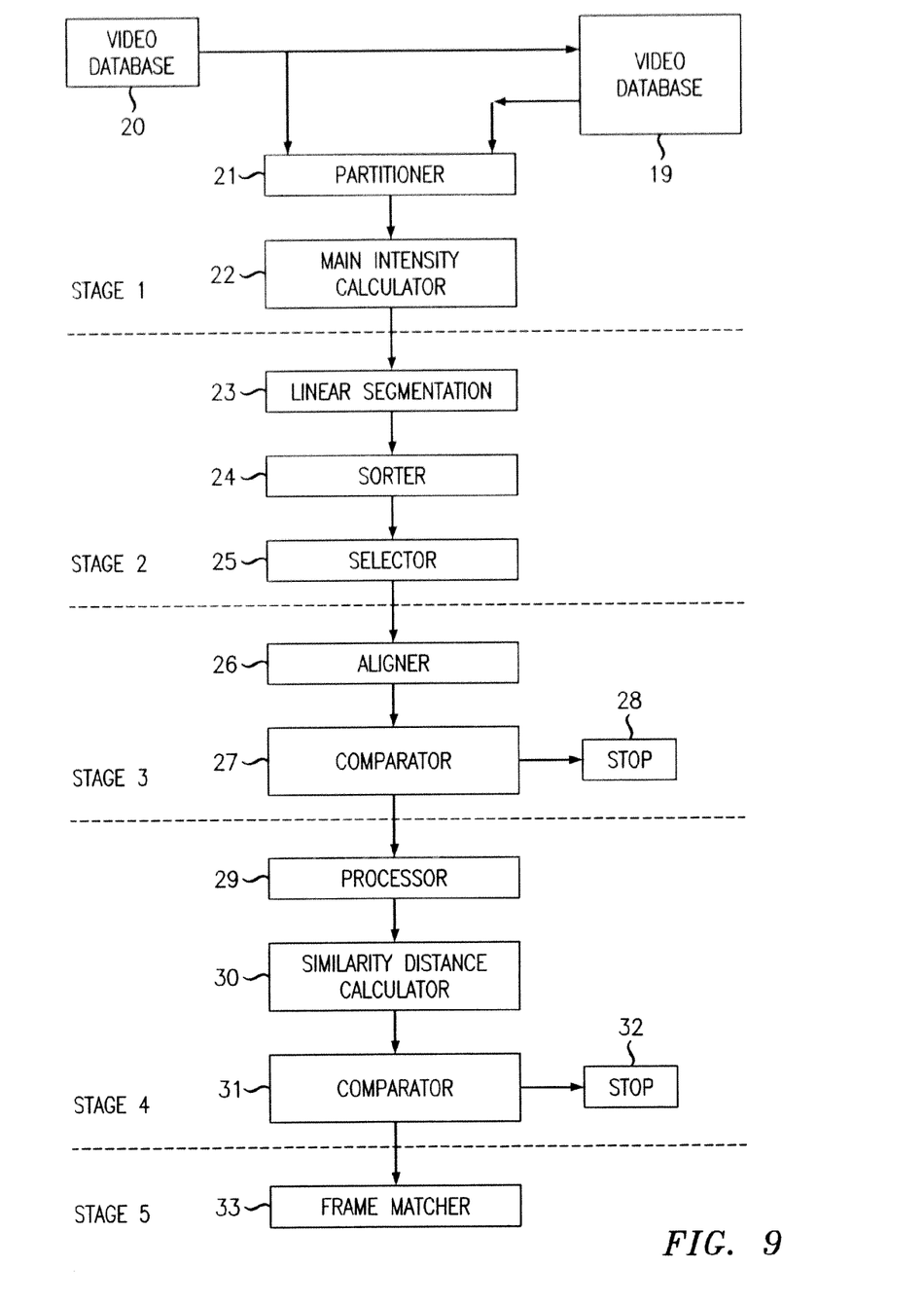
FIG. 9 schematically illustrates an apparatus in accordance with the invention.

With reference to FIG. 9, a video management apparatus includes a database or store 19 which holds video files. The database 19 may be one which is generally accessible to users via the Internet or may, for example, be a library or other depository with restricted access. Other types of store or database may be used instead or in addition to these possibilities.

A user transmits a video Q that he or she wants to add to the database 19 by submitting the video Q via a user interface 20. The video Q is sent to the video database 19 and also to a partitioner 21. At Stage 1 of the operation, the partitioner 21 partitions each frame of the video Q into N1×N2 blocks. A calculator 22 calculates the mean intensity values for each of the blocks.

At Stage 2, mean intensity value data is received by a segmenter 23 from the calculator 22. The segmenter 23 segments the changes of mean intensities of each block. A sorter 24 then sorts the linear segments from all blocks based on the segment starting frame IDs into a sorted list. A selector 25 receives the sorted list and selects major inclines/major declines from the sorted list.

In the next stage, Stage 3, an aligner 26 attempts to find an approximate match between the selected major inclines and major declines of the query video and those of one or more target videos that have undergone similar processing. The results are tested by a first comparator 27. If there is no similarity, judged against a given threshold parameter, then the query video and target video or videos are deemed to not be duplicates and the duplication detection process stops at 28.

If the comparator 27 detects approximate alignment, at Stage 4, a handed Smith-Waterman algorithm is applied by processor 29 and the results applied to a similarity distance calculator 30. The output of the similarity distance calculator 30 is checked against a given threshold by a second comparator 31. If there is insufficient similarity, the compared videos are deemed not to be duplicates and the process stops at 32.

If there is sufficient similarity, at Stage 5, a frame matcher 33 checks unmatched frame positions for video insertions, deletions or substitutions.

The results of the duplicate detection process are sent to the video database 19 to be used in managing the stored videos. If the query video is not found to be a duplicate, the video database 19 accepts it for storage. If the query video is found to be a duplicate, then in one embodiment, the video database 19 rejects it with or without a message to the user to inform them.

In an alternative embodiment, or mode, if the query video is found to be a duplicate, it is accepted into the video database 19 but it is denoted as a duplicate, preferably with a reference to the target video that it matches. Duplicate videos may be collected together in a group. When a search performed on the database calls up one of the group, other group members may be suppressed from the search results or are given a lower ranking in the search results than they would otherwise merit, so that any duplicates tend to be presented after other non-duplicates.

The video management apparatus of FIG. 9 may be modified so that videos held in the video database 19 are partitioned and processed at 21 and 22 prior to the query video being submitted. For example, in one embodiment, data obtained when a video is submitted to be examined for duplicates may be retained and sent to be stored at the video database 19. If that video is subsequently not accepted into the database 19, the data is deleted. When the video is accepted into the database, the data associated with it is retained and is available for use in the aligner 26. In another embodiment, videos in the video database 19 may be partitioned and processed in Stage 1 and Stage 2 without necessarily having been used in testing for duplicates. For example, the data processing may be carried out as part of a preparation phase before opening the database to receive new videos.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for comparing a query video and a target video, the method including:

partitioning frames of the query video and frames of the target video into blocks;

calculating the mean intensity values for the blocks;

producing a plurality of query time series for the query video, the query time series representing temporal variation in mean intensity value for blocks from the same location in different frames of the query video;

producing a plurality of target time series for the target video, the target time series representing temporal variation in mean intensity value for blocks from the same location in different frames of the target video;

determining if alignment exists between the query video and the target video using the query time series and the target time series;

segmenting the query time series and the target time series into a respective set of discrete linear segments; and performing local sequence alignment of those linear segments.

2. The method as claimed in claim 1, further including selecting major inclines and major declines from the segmented time series and using the major inclines and major declines in performing alignment.

3. The method as claimed in claim 2 wherein the selected major inclines and the major declines exclude jump inclines and jump declines.

4. The method as claimed in claim 1, further including comparing major inclines and declines of the query video with major inclines and major declines of the target video to obtain approximate alignments with consecutive matched inclines and declines.

5. The method as claimed in claim 4, further including matching a query video sequence of major inclines/major declines against a target video sequence of major inclines/major declines.

6. The method as claimed in claim 5, wherein the matching is carried out by creating a matrix having cells with the query video sequence of major inclines/major declines plotted against a target video sequence of major inclines/major declines and, where a match exists, adding a marker in an appropriate cell of the matrix.

7. The method as claimed in claim 6, wherein after aligning major inclines/major declines, the method further includes extending the major inclines/major declines to neighbour non-major inclines/non-major declines.

8. The method as claimed in claim 7, further including identifying diagonal lines of consecutive cells having markers and retaining those diagonal lines having a length that is greater than a given threshold for additional alignment processing.

9. The method as claimed in claim 8, further including selecting the K longest diagonal lines and attempting to join closely located segments included in the top K diagonal lines to form a longer segment.

10. The method as claimed in claim 9, further including awarding reward scores to diagonal matched lines and penalty scores to gaps in longer lines and, when the combined score of a linked approximate alignment exceeds a given score threshold, checking if previously ignored initial short aligned segments around the linked segments can be joined to form an approximate alignment, and selecting the local approximate alignments having final scores exceeding a final score threshold for further examination.

11. The method as claimed in claim 2, further including obtaining an approximate alignment of segments to select a set of possible successful alignments and then applying a Smith-Waterman algorithm to the selected set.

12. The method as claimed in claim 11, further including performing alignment at level for approximate aligned segments not included in the selected set.

13. The method as claimed in claim 1, further including storing the query video in a video database holding the target video when the query video is determined not to be a duplicate of the target video.

14. A device comprising:

a processor; and memory storing instructions that, when executed, cause the device to perform a method of:

partitioning frames of the query video and frames of the target video into blocks;

calculating the mean intensity values for the blocks;

producing a plurality of query time series for the query video, the query time series representing temporal variation in mean intensity value for blocks from the same location in different frames of the query video;

producing a plurality of target time series for the target video, the target time series representing temporal variation in mean intensity value for blocks from the same location in different frames of the target video;

determining if alignment exists between the query video and the target video using the query time series and the target time series;

segmenting the query time series and the target time series into a respective set of discrete linear segments; and performing local sequence alignment of those linear segments.

15. The device as claimed in claim 14, wherein the method further includes selecting major inclines and major declines from the segmented time series and using the major inclines and major declines in performing alignment.

16. The device as claimed in claim 15, wherein the selected major inclines and the major declines exclude jump segments.

17. The device as claimed in claim 14, wherein the method further includes comparing major inclines and declines of the query video with major inclines and major declines of the target video to obtain approximate alignments with consecutive matched inclines and declines.

18. The device as claimed in claim 17, wherein the method further includes matching a query video sequence of major inclines/major declines against a target video sequence of major inclines/major declines.

19. The device as claimed in claim 18, wherein the method further includes matching by creating a matrix having cells with the query video sequence of major inclines/major declines plotted against a target video sequence of major inclines/major declines and, where a match exists, adding a marker in an appropriate cell of the matrix.

20. The device as claimed in claim 19, wherein the method further includes extending the major inclines/major declines to neighbour non-major inclines/non-major declines after aligning major inclines/major declines.

21. The device as claimed in claim 20, wherein the method further includes identify diagonal lines of consecutive cells having markers and retaining those diagonal lines having a length that is greater than a given threshold for additional alignment processing.

22. The device as claimed in claim 21, wherein the method further includes select the K longest diagonal lines and attempt to join closely located segments included in the top K diagonal lines to form a longer segment.

23. The device as claimed in claim 22, wherein the method further includes awarding reward scores to diagonal matched lines and penalty scores to gaps in longer lines and, when the combined score of a linked approximate alignment exceeds a given score threshold, checking if previously ignored initial short aligned segments around the linked segments can be joined to form an approximate alignment, and selecting the local approximate alignments having final scores exceeding a final score threshold for further examination.

24. The device as claimed in claim 14, wherein the method further includes obtaining an approximate alignment of segments selecting a set of possible successful alignments and then applying a Smith-Waterman algorithm to the selected set.

25. The device as claimed in claim 24, wherein the method further includes performing alignment at frame level for approximate aligned segments not included in the selected set.

26. The device as claimed in claim 14, wherein the method further includes the query video in a video database holding the target video when the query video is determined not to be a duplicate of the target video.

27. A non-transitory computer-readable medium storing instructions that, when executed by a computer, cause the computer to:

partition frames of the query video and frames of the target video into blocks;

calculate the mean intensity values for the blocks;

produce a plurality of query time series for the query video, the query time series representing temporal variation in mean intensity value for blocks from the same location in different frames of the query video;

produce a plurality of target time series for the target video, the target time series representing temporal variation in mean intensity value for blocks from the same location in different frames of the target video;

determine if alignment exists between the query video and the target video using the query time series and the target time series;

segment the query time series and the target time series into a respective set of discrete linear segments; and perform local sequence alignment of those linear segments.

* * * * *